May 29, 1962     O. T. STONE     3,036,865
COMBINATION DUMP AND HIGH-LIFT TRUCK
Filed Nov. 18, 1959

INVENTOR
O. T. STONE

BY *H. Yates Dowell*
ATTORNEY 3,036,865
COMBINATION DUMP AND HIGH-LIFT TRUCK
Oscar T. Stone, Lakeland, Fla., assignor to Lakeland Equipment Co., Inc., Lakeland, Fla., a corporation of Florida
Filed Nov. 18, 1959, Ser. No. 853,893
4 Claims. (Cl. 298—22)

This invention relates to the handling of commodities of various kinds including the loading, transportation, unloading and storage of the same and to trucks or other vehicles used in connection with the loading, unloading and transportation of such commodities.

The invention relates particularly to vehicles having a body or load support on which objects can be placed and by which such body with objects therein can be lifted from a relatively lower position to a higher position and to the modification of such vehicles to increase the usefulness thereof.

Certain kinds of trucks or the like vehicles are provided with bodies or platforms mounted on frame structures by which the bodies can be raised from a low to an elevated position and returned to such low position. Vehicles of this kind lack facilities for expediting the loading and unloading or the converting of the vehicle to a dump truck.

It is an object of the invention to provide means whereby a high lift truck can be easily and quickly converted from a high lift truck to a dump truck.

Another object of the invention is to provide for the locking in place or the unlocking and removal of a pivot between the cross frame members of a high lift truck to permit the pivotal movement of the parts to perform a dumping action and thereby to convert the high lift truck to a dump truck.

Figure 1:
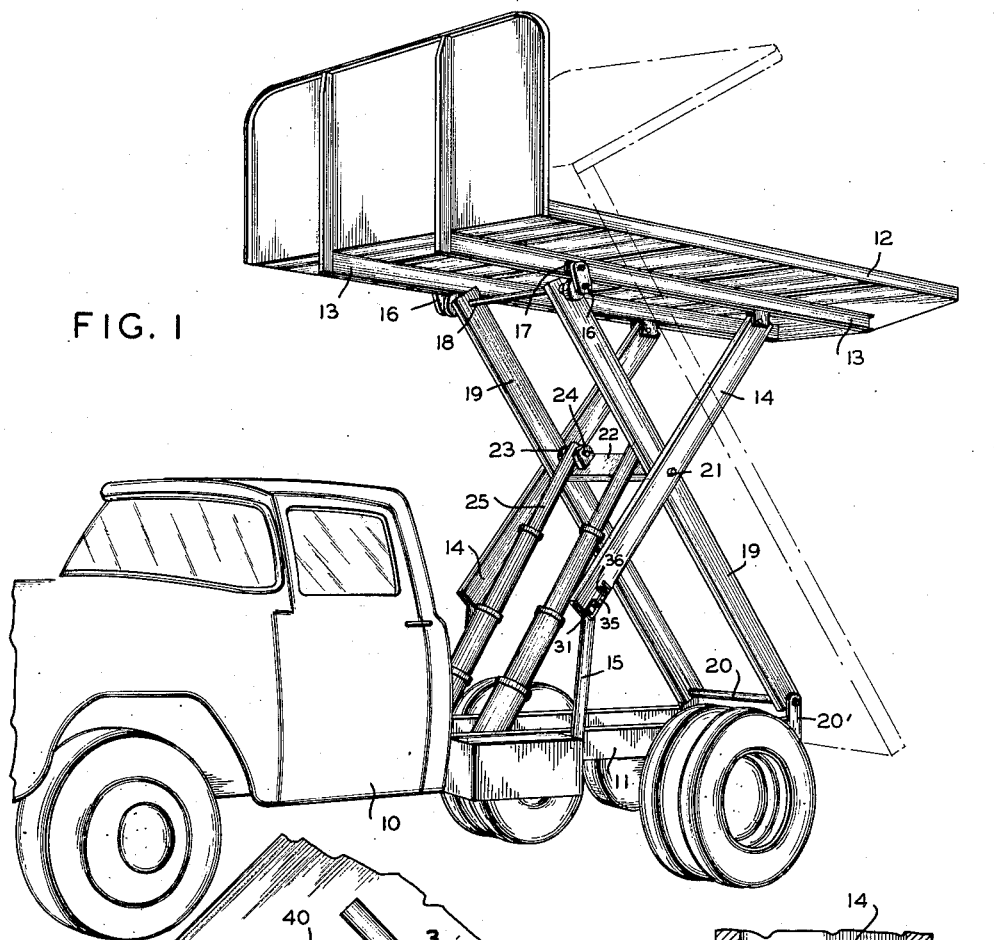
Figures 2, 3:
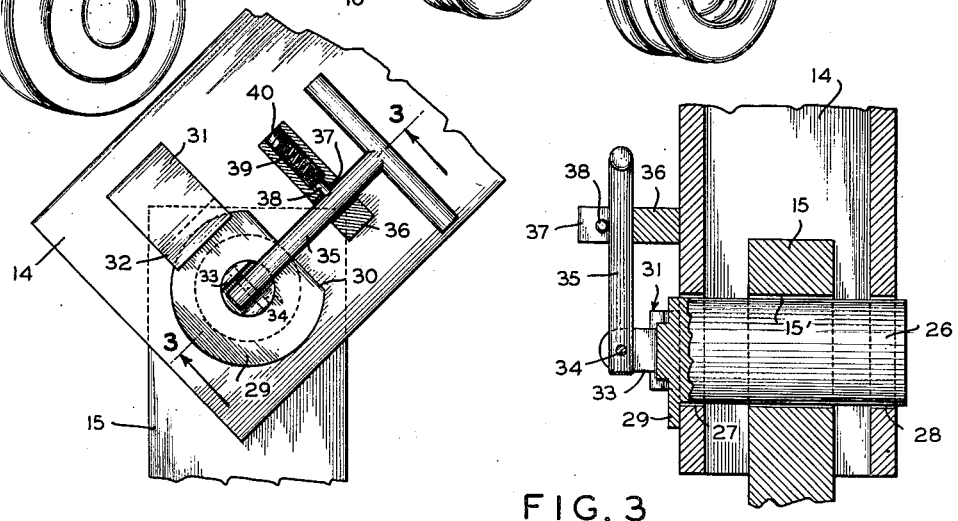

Other objects and advantages of the invention will be apparent from the following description taken in conjunction with the accompanying drawing wherein:

FIG. 1 is a perspective illustrating one application of the invention;

FIG. 2, an enlarged fragmentary detail of the pivot pin; and

FIG. 3, a section on the line 3—3 of FIG. 2.

Briefly stated the invention is the substitution for similar members not intended to be removed of a pivot pin which either can be locked in place or can be removed from the lower forward ends of the cross frame members of a high lift truck for converting the truck into a dump truck and which is accomplished by providing a removable pivot pin having a flanged or enlarged head normally located beneath a keeper but with such head having a portion cut away or removed so that the side of the same is flattened in a manner whereby it will clear the keeper when such flattened side is adjacent the keeper but which can be rotated to offset position so that the keeper will retain the pin in place. The head of the pin has pivoted thereto a T-shaped rotating and locking handle movable to a position at right angles to the pin into contact with a spring loaded detent or ball-catch to retain the parts in locked position. When the parts are in locked position the T-shaped rotating and locking handle is disposed at right angles to the pin in contact with the spring loaded detent or ball-catch mounted on the lift arms of the truck. When it is desired to convert the truck from a high lift to a dump truck the T-shaped handle is removed from the spring catch and the pin is rotated to release the lift arms of the truck platform from the hold-down arms connected to the truck body, and then when force is applied to raise the platform, such platform will pivot about the rear high lift arms attached to the rear of the truck so that only the front of the platform of the truck will be elevated.

With continued reference to the drawing, a truck 10 has a chassis 11 on which is mounted a bed or platform 12 with a supporting undercarriage including a pair of spaced longitudinal channel members 13 to which the upper ends of a pair of box beam elevating arms 14 are pivotally connected. The lower ends of the arms 14 are pivoted to the upper ends of retention or hold-down links 15 pivoted at their lower ends to the chassis 11.

To the forward portions of such undercarriage members are secured by means of links 16 mounted on rollers 17 movable on the channel members 13 and with the remote ends of such links connected to a cross bar 18 on which are pivoted a pair of arms 19 the lower ends of which arms are mounted on a cross bar 20 carried on brackets 21 on the chassis 11.

Due to the pivotal connection of the lower end of the frame members or arms 14 with the chassis by means of the hold-down links 15 and the sliding connection of the upper ends of the frame members or arms 19 with the undercarriage 13 of the bed or body such bed or body can be raised or lowered by raising and lowering a pivot rod 21 extending through the frame members 14 and 19 at their crossing points. In order to provide power necessary to produce the raising and lowering action the rod 21 is provided with a mounting plate 22 having two pairs of spaced lugs 23 with a pivot pin or bolt 24 between each pair on which is mounted the upper end of a hydraulic multiple action telescopic piston 25 the lower ends of which are pivoted to the chassis 11. Conventional means (not shown) are provided for supplying hydraulic fluid for producing the necessary elevating action.

The frame members 14 are ordinarily connected to the hold-down links 15 by pivot pins which cannot be removed but in accordance with the present invention pivot pins 26 are employed which extend through openings 27 and 28 in the frame members 14 which are generally U-shaped in cross section at their lower ends and between the spaced sides of which the hold-down links 15 are disposed, such members having openings 15' in which the removable pivot pins 26 are received. Each pivot pin 26 is provided with a flange 29 having a cut-away portion 30 and a keeper 31 is secured to the arm 14 and has a portion 32 overlying the margin of the flange 29. When the pin 26 is rotated so that the cut-away portion 30 is adjacent such overhang 32 the pin 26 may be removed to free the arm 14 from the cooperating hold-down link 15.

The end of the pivot pin adjacent the flange 29 is provided with a pair of spaced projections 33 which receive a pin 34. A T-shaped handle 35 is pivotally mounted on the pin 34 between the spaced projections 33 and such handle is utilized to rotate the pin 26 to align the cut-away portion 30 with the keeper 31 for removal of the pin and conversely when inserting the pivot pin to join the arms 14 and hold-down links 15, such handle is turned to rotate the pin so that the portion 32 of the keeper will overlie the flange 29 and prevent the withdrawal of the pin 26. The handle 35 may be rotated to a position substantially perpendicular to the pin 26 and parallel to the arm 14 and maintained in such position by a retention means in the form of a block 36 having a slot 37. A detent 38 is adapted to extend into the slot 37 to maintain the handle within such slot. The detent 38 is biased towards said slot by a spring 39 held in position by a removable screw plug 40 which serves as a means for varying the tension on the spring 39. In order to remove the handle from the retention block, the handle is grasped and pivoted upwardly about the pin 34 to force the detent inwardly against the tension of the spring 39.

In the operation of the device the T-shaped handle is forcibly removed from the retention block whereupon it is used as a lever to rotate the pin 26 to bring the cut-away portion 30 of the flange 29 to a position adjacent the portion 32 of the keeper 31 so that force can be applied to the T-shaped handle to retract the pin from the openings 28, 15' and 27 to free the arm 14 from the hold-down link 15.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A removable pivot pin for connecting two arms having pin receiving openings in such a manner that said arms may be separated when desired comprising a generally cylindrical pin for insertion in said openings and having a flange near one end, said flange being cut away along one side, a keeper mounted on one of said arms adjacent said pin receiving openings, a portion of said keeper overlying said flange when said pin is in said openings, a T-shaped handle pivotally connected to said pin and movable from a position in axial alignment with said pin to a position at right angles thereto, spring pressed locking means whereby said handle can be removed from said locking means and rotated to cause rotation of said pin until the flattened portion of the flange is adjacent the overlying portion of the keeper whereupon the pin may be removed from said openings.

2. A removable pivot pin for connecting two arms and pin receiving openings which may be separated when desired comprising a generally cylindrical pin for insertion in said openings, a flange near one end of said pin, said flange being cut away along one side thereof, means mounted on one of said arms for overlying said flange but not overlying said cut away portion when said means and said cut away portion are adjacent each other, a T-shaped handle pivotally connected to said pin for rotating the latter, means for detachably locking said handle when said means mounted on the arm is overlying a portion of the flange whereby said handle may be removed from said locking means and rotated to rotate said pin until said cut away portion of said flange is adjacent the overlying portion of the means mounted on one of said arms whereupon said pivot pin may be removed from said openings.

3. In a combination dump and high lift truck having a chassis, a load supporting bed, a first and a second pair of arms mounting said bed on said chassis with one end of each arm of the first pair pivotally connected to the rear end of said load supporting bed, the second pair of arms pivotally connected to said first pair of arms and pivotally connected to the rear end of said chassis and movably connected to said supporting bed, hydraulic means connected between the chassis and said second pair of arms for producing movement of said first and second pairs of arms to raise and lower said bed, a pair of hold-down links mounted on said chassis and pivotally connectable to said first pair of arms, removable pivot pins for connecting said first pair of arms to said pair of hold-down links, said pivot pins having enlarged flanges with cut-away portions thereon, a keeper on one of said first pair of arms and link of each set of an arm of said first pair of arms and its cooperating link of said pair of hold-down links for overlying the flange of the cooperating pivot pin whereby when the cut-away portion of each flange is adjacent its keeper said pins can be inserted or removed, a locking and removing handle pivotally connected to each pin and movable from a position in axial alignment with the cooperating pin to a position at substantially right angles thereto, and locking means including a spring pressed detent mounted on one of the arm and link of each set of cooperating arm and link for engaging said handle when said handle is at substantially right angles to said pin for maintaining the pin in operative position with the flange beneath the keeper.

4. A combination dump and high lift truck having a chassis, a load supporting bed, a first and a second pair of arms mounting said bed on said chassis, the first pair of arms being pivotally connected to the rear end of said supporting bed and being pivotally connected to the second pair of arms, said second pair of arms being pivotally mounted at one end on the rear end of said chassis and being movably mounted on its other end on said supporting bed, hydraulic means between said chassis and said second pair of arms for causing movement thereof to raise and lower said bed and to pivot said bed, a pair of hold-down links pivotally mounted on said chassis and connectable to said first pair of arms, removable pivot pins for connecting said first pair of arms to said pair of hold-down links, each pivot pin having a flange with a cut-away portion adjacent one end thereof, a keeper on one of the set of an arm of said first pair of arms and its cooperating link for overlying the flange of the cooperating pin, a handle pivotally mounted on one end of each pin adjacent its flange and movable from a position in axial alignment with said pin to a position at substantially right angles thereto, and spring pressed locking means mounted on one of the set of an arm of said first pair of arms and its cooperating link for engaging said handle when it is at substantially right angles to its cooperating pin when said flange is beneath the cooperating keeper and permitting said handle to be retracted from said locking means and rotated so that said cut-away portion of said flange is adjacent its cooperating keeper to permit insertion and removal of said pins.

References Cited in the file of this patent
UNITED STATES PATENTS

| | | |
|---|---|---|
| 1,933,689 | Wirz | Nov. 7, 1933 |
| 2,412,158 | Kuehlman et al. | Dec. 3, 1946 |
| 2,835,522 | Serto | May 20, 1958 |
| 2,911,245 | Kurz | Nov. 3, 1959 |

FOREIGN PATENTS

| | | |
|---|---|---|
| 623,974 | Great Britain | Dec. 5, 1949 |